R. B. SHAW.
AUTOMOBILE LICENSE FASTENER.
APPLICATION FILED APR. 14, 1920.
1,398,401. Patented Nov. 29, 1921.
Fig. 1.
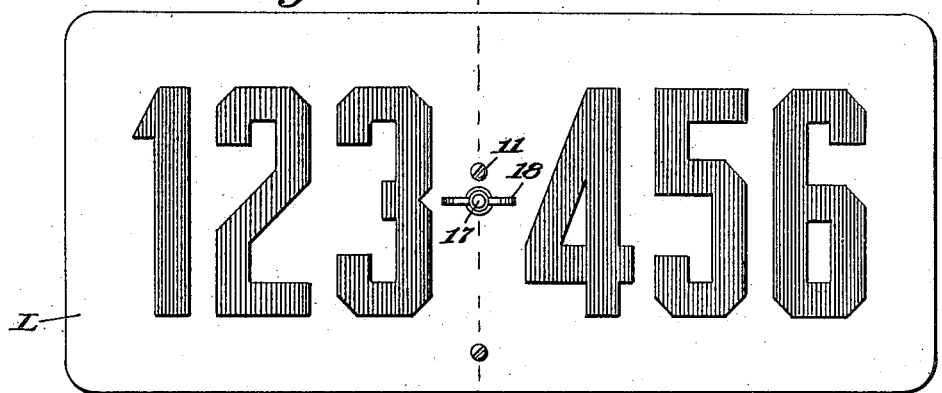
Fig. 2.    Fig. 3.   Fig. 4.   Fig. 5. Fig. 6.
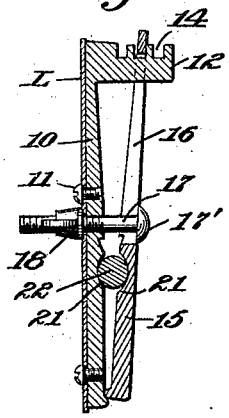 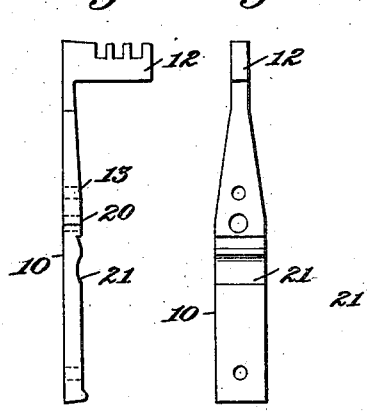 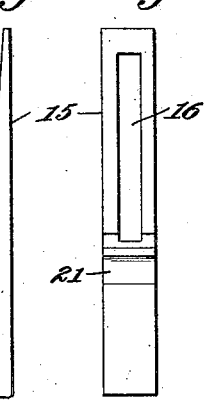
Fig. 7.    Fig. 8.
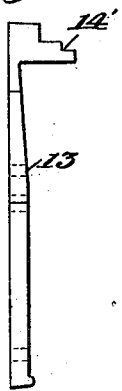 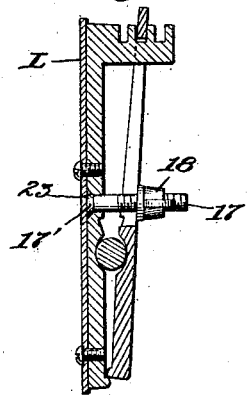
Inventor:
R. B. Shaw
By Cushman, Bryant & Varley
Att'ys.

UNITED STATES PATENT OFFICE.

RYLAND B. SHAW, OF DECATUR, ILLINOIS.

AUTOMOBILE-LICENSE FASTENER.

1,398,401.  Specification of Letters Patent.  Patented Nov. 29, 1921.

Application filed April 14, 1920. Serial No. 373,762.

*To all whom it may concern:*

Be it known that I, RYLAND B. SHAW, a citizen of the United States, residing at Decatur, in the county of Macon and State of Illinois, have invented new and useful Improvements in Automobile-License Fasteners, of which the following is a specification.

This invention relates to means for fastening in position signs or display members and is particularly intended for the support of license tags upon vehicles.

The object of this invention is the provision of a fastener which may be readily secured to the license tag and quickly fastened to any selected part of the vehicle.

Another object of the invention is the provision of a fastening device which may be secured to the license tag before either the tag or the fastening member are placed upon the vehicle, which is readily adjustable so that the same may clamp any convenient part of the vehicle, and which is simple in operation and inexpensive to manufacture.

Other objects of the invention will become obvious from a reading of the following description and appended claims, wherein the invention is set forth more in detail.

Referring to the accompanying drawings wherein one embodiment of my invention with minor modifications is shown:

Figure 1 is a front elevational view of the same having secured thereto an automobile license tag, Fig. 2 is a vertical sectional view on the line 2—2 of Fig. 1, Fig. 3 is a side elevation of one of the clamping bars, Fig. 4 is a front elevational view of the bar shown in Fig. 3, Figs. 5 and 6 are side and front elevational views of the complementary clamping bar, Fig. 7 is a view of a modified form of the clamping bar shown in Fig. 3, and Fig. 8 is a view similar to Fig. 2 showing a different arrangement of the clamping bolt with relation to the clamping bars.

Referring to the drawings more in detail 10 indicates a clamping bar adapted to be secured to the rear face of a license tag L by any suitable means, such as the screws 11 passing through the license tag and into openings 13 in the clamping bar. It will be understood that any means may be used to secure the tag or display member to the clamping bar but since automobile license tags are generally issued with screw holes formed therein, the form of fastening means shown is readily adapted for use in this connection. Obviously the clamping bar may be made of any desirable size and the openings for the screws may be formed therein at any point along its length. The clamping bar is shown in Fig. 1 as secured to the rear face of the license plate at approximately its center, although, of course, it may be secured in any other position, and has formed thereon and extending at an angle thereto a lug 12 formed with a plurality of notches 14 located at differently spaced points from the clamping bar. These notches may be in the form shown in Figs. 2 and 3 or may be modified as shown in Fig. 7, so as to be in stepped relation as indicated at 14′.

So as to coöperate with the clamping bar 10 there is provided a complementary clamping bar 15 having an elongated central slot 16 therein and adapted to be supported in any selected one of the notches formed in the lug 12. It will be observed that the notches 14 are made of greater width than the thickness of the clamping bars 15 at their point of suspension so as to permit the clamping bars 15 to pivotally swing at their point of support and to be drawn to clamping relation with the clamping bar 10.

In order to draw together these two bars any suitable means may be employed, but in the embodiment of my invention disclosed there is shown a clamping bolt 17 passing through each of the clamping bars, and in Fig. 2 having its shank passing through the license plate. Upon the shank of the bolt is threaded a wing nut 18 which may be adjusted so as to clamp between the clamping bars any fixed part of the vehicle. In Fig. 2 it will be observed that the head 17′ of the bolt is located at the rear of the clamping bar 15 and its shank passes through the central slot 17 of the rear clamping bar and through an opening 20 in the clamping bar 10. This arrangement may be modified, as shown in Fig. 8, and the head of the bolt may be located behind the license plate in a countersink 23 with its shank passing through the clamping members and extending to the rear of the clamping bar 15 where the wing nut may be placed thereon. With this latter arrangement it becomes unnecessary to form an opening in the license tag for the passage of the shank of the clamping bolt therethrough and the appearance of the tag is not marred by the location of the bolt shank and wing nut upon the face of the tag.

The meeting faces of the clamping bars may be provided with grooves 21 so as to permit the rigid clamping of a member which may be fixed to a vehicle and have a curved surface, as the bar 22, although it is to be understood that other members may be clamped between the bars at any point below or above the location of the clamping bolt.

In Fig. 2 the clamping bar 15 is shown as positioned in the central notch 14, although, obviously the bar may be positioned in any selected notch so as to vary the amplitude of its gripping movement about its fulcrum point. Emphasis is laid upon the general adaptability of this fastening member whereby the same may be positioned upon any selected part of the vehicle, and attention is called to the fact that the same is entirely concealed behind the license tag and hence does not cause an unsightly appearance when attached to the vehicle. It will be noted that the fastening member may be attached to the tag before either the tag or the fastening member are secured to the vehicle, and due to the fact that practically all license tags are formed with openings for the reception of such fastening members as the screws 11, the fastening member may be attached to any license tag merely by the suitable location of the screw receiving openings in the clamping bar 10. Moreover, when the arrangement shown in Fig. 8 is resorted to, it is unnecessary to perforate the license tag in any manner whatsoever.

Although in the accompanying drawings and in this description a particular embodiment or embodiments of my invention have been described in detail, it is clear that the same is not restricted to the particular construction set forth and that the salient points of the invention might be embodied in many modified forms without departing from the spirit and scope of the invention.

What I claim is:

1. In a device of the class described, a clamping bar, means for securing a display member to said bar, a second complementary clamping bar, a lug on and extending at an angle from said first mentioned clamping bar and having a plurality of spaced notches therein, said second mentioned clamping bar being adapted to be supported in any selected notch of said lug so as to vary the amplitude of the clamping movement of said bar and means for drawing together said bars to clamp a support.

2. In a device of the class described, a clamping bar, means for securing a display member to said bar, a second complementary clamping bar, a lug on and extending at an angle from said first mentioned clamping bar and having a plurality of spaced notches therein, said second mentioned clamping bar being adapted to be pivotally supported at one end in any selected notch of said lug so as to vary the amplitude of the clamping movement of said bar and means for drawing together said bars to clamp a support.

3. In a device of the class described, a clamping bar, means for securing a display member to said bar, a second complementary clamping bar, a lug on and extending at approximately a right angle from said first mentioned clamping bar and having a plurality of notches at variably spaced distances from said clamping bar, said second bar being adapted to be pivotally supported in any selected notch of said lug so as to vary the amplitude of the clamping movement of said bar, and a clamping bolt connecting said clamping bars and having a nut thereon adapted to draw together said bars to clamp a support.

4. In a device of the class described, a clamping bar adapted to be secured to the rear face of a display member and to extend across the face of the same, a lug on said bar extending at a right angle to the same rearwardly from said display member, said lug having a plurality of notches at variably spaced distances from said clamping bar, a second clamping bar adapted to be pivotally supported in any selected notch on said lug so as to vary the amplitude of the clamping movement of the second mentioned clamping bar, and means adjustably connecting said clamping bars located to one side of the pivotal support of said second mentioned bar and adapted to draw together said clamping bars to clamp a support.

In testimony whereof I have hereunto set my hand.

RYLAND B. SHAW.